US012780968B2

(12) United States Patent
Okada et al.

(10) Patent No.: US 12,780,968 B2
(45) Date of Patent: Nov. 3, 2026

(54) METHOD FOR PRODUCING FLUOROPOLYMER

(71) Applicant: DAIKIN INDUSTRIES, LTD., Osaka (JP)

(72) Inventors: Manami Okada, Osaka (JP); Daisuke Kubota, Osaka (JP); Takashi Sekiguchi, Osaka (JP); Manabu Fujisawa, Osaka (JP); Tatsuya Funaoka, Osaka (JP); Yohei Takakura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 629 days.

(21) Appl. No.: 18/340,164

(22) Filed: Jun. 23, 2023

(65) Prior Publication Data

US 2023/0331886 A1 Oct. 19, 2023

Related U.S. Application Data

(63) Continuation of application No. PCT/JP2021/047710, filed on Dec. 22, 2021.

(30) Foreign Application Priority Data

Dec. 24, 2020 (JP) ................................ 2020-215417

(51) Int. Cl.

| | |
|---|---|
| ***C08F 214/24*** | (2006.01) |
| ***C08F 2/06*** | (2006.01) |
| ***C08K 5/06*** | (2006.01) |

(52) U.S. Cl.

CPC ............ *C08F 214/242* (2013.01); *C08F 2/06* (2013.01); *C08F 214/245* (2013.01); *C08K 5/06* (2013.01)

(58) Field of Classification Search

CPC .......... C08F 2/06; C08F 14/26; C08F 14/185; C08K 5/06

USPC ........................................ 526/209, 249, 250

See application file for complete search history.

(56) References Cited

U.S. PATENT DOCUMENTS

| | | | |
|---|---|---|---|
| 5,182,342 | A | 1/1993 | Feiring et al. |
| 6,258,907 | B1 | 7/2001 | Funaki et al. |
| 2007/0051916 | A1 | 3/2007 | Flynn et al. |
| 2008/0086019 | A1 | 4/2008 | Okamoto et al. |
| 2010/0227992 | A1 | 9/2010 | Hintzer et al. |
| 2015/0376100 | A1 | 12/2015 | Zenke et al. |
| 2020/0362077 | A1 | 11/2020 | Yano et al. |

FOREIGN PATENT DOCUMENTS

| | | | |
|---|---|---|---|
| CN | 101263103 | A | 9/2008 |
| CN | 101506250 | A | 8/2009 |
| JP | 07-504224 | A | 5/1995 |
| JP | 11-035694 | A | 2/1999 |
| JP | 11-092507 | A | 4/1999 |
| JP | 2005-029704 | A | 2/2005 |
| JP | 2009-507840 | A | 2/2009 |
| JP | 2010-501673 | A | 1/2010 |
| JP | 2012-241128 | A | 12/2012 |
| JP | 2014-159410 | A | 9/2014 |
| WO | 2006/123563 | A1 | 11/2006 |
| WO | 2007/030314 | A2 | 3/2007 |
| WO | 2019/093433 | A1 | 5/2019 |

OTHER PUBLICATIONS

Supplemental Data, pp. 1-12, to “A Critical Review of the Application of Polymer of Low Concern and Regulatory Criteria to Fluoropolymers,” Barabara J. Henry, et al., Integrated Environmental Assessment and Management, 2018, 14(3), pp. 316-334. (Year: 2018).*

Barbara J Henry, et al., “A Critical Review of the Application of Polymer of Low Concern and Regulatory Criteria to Fluoropolymers”, Integrated Environmental Assessment and Management, 2018, vol. 14, No. 3, pp. 316-334 (19 pages total).

Sigma-Aldrich et al., “Hexafluoroisopropyl methyl ether”, 2024, XP002812310, 1 page total, retrieved from URL: https://www.sigmaaldrich.com/ES/en/search/hexaflurorisopropyl-methylether?focus=products&page=1&perpage=30&sort=relevance&term=hexafluoroisopropyl%20methy%20ether%type=product.

(Continued)

*Primary Examiner* — Fred M Teskin

(74) *Attorney, Agent, or Firm* — Sughrue Mion, PLLC

(57) ABSTRACT

A method for producing a fluoropolymer, which includes polymerizing a fluoromonomer in a solvent to produce the fluoropolymer. The solvent contains a fluorine-containing ether compound (1) represented by formula: $R^1$—O—$R^2$ wherein $R^1$ represents a partially fluorinated alkyl group, and $R^2$ represents a non-fluorinated alkyl group, a partially fluorinated alkyl group, or a completely fluorinated alkyl group, and in the solvent, a content of a fluorine-containing olefin compound (2) represented by formula: $R^3$—CF═CF—$R^4$—O—$R^2$ wherein $R^3$ represents H, F, a partially fluorinated alkyl group, or a completely fluorinated alkyl group, $R^4$ represents a single bond, a partially fluorinated alkylene group, or a completely fluorinated alkylene group, and $R^2$ is the same as described above, is 1.00% by mass or less based on a content of the fluorine-containing ether compound (1), and wherein the fluoromonomer is selected from tetrafluoroethylene, chlorotrifluoroethylene, and vinylidene fluoride.

11 Claims, No Drawings

(56) References Cited

OTHER PUBLICATIONS

Extended European Search Report dated Oct. 17, 2024 from the European Patent Office in Application No. 21910908.9.
International Preliminary Report on Patentability dated Jun. 13, 2023 with a translation of the Written Opinion in Application No. PCT/JP2021/047710.
Junji Murata et al., "Selective synthesis of fluorinated ethers by addition reaction of alcohols to fluorinated olefings in water", The Royal Society of Chemistry, 2002, vol. 4, pp. 60-63.
International Search Report for PCT/JP2021/047710 dated Mar. 1, 2022.

* cited by examiner

METHOD FOR PRODUCING FLUOROPOLYMER

CROSS-REFERENCE TO RELATED APPLICATIONS

This application is a Rule 53(b) Continuation of International Application No. PCT/JP2021/047710 filed Dec. 22, 2021, which claims priority based on Japanese Patent Application No. 2020-215417 filed Dec. 24, 2020, the respective disclosures of which are incorporated herein by reference in their entireties.

TECHNICAL FIELD

The present disclosure relates to a method for producing a fluoropolymer.

BACKGROUND ART

A emulsion polymerization method, a suspension polymerization method, and a solution polymerization method are known as methods for producing a fluoropolymer. In these polymerization methods, fluorinated solvents are used as a polymerization media.

Patent Document 1 proposes a polymerization method including bringing a solvent into contact with a fluoromonomer, the solvent being such that: the solvent contains carbon, fluorine, at least one hydrogen atom, fluorine atom(s) whose number is at least the same with the number of the hydrogen atom(s), and adjacent —$CH_2$— groups whose number does not exceed two; each primary carbon does not have a hydrogen atom; and the solvent should not contain a methyl group (—$CH_3$) except for a —$CF_2OCH_3$ atomic group.

Patent Document 2 proposes a method for producing a fluorine-containing polymer, wherein in producing the fluorine-containing polymer by polymerization in a polymerization medium, the polymerization medium is a (perfluoroalkyl) alkyl ether, such as $F(CF_2)_4OCH_3$, $F(CF_2)_4OC_2H_5$, $(CF_3)_2CFOCH_3$, or $F(CF_2)_3OCH_3$.

Patent Document 3 proposes a method for producing a fluorine-containing polymer including radically polymerizing a fluoromonomer in a polymerization medium, wherein the polymerization medium used is a hydrofluoroalkyl ether, such as $CF_3CH_2OCF_2CHF_2$, $CHF_2CF_2CH_2OCF_2CHF_2$, or $CF_3CF_2CH_2OCF_2CHF_2$.

CITATION LIST

Patent Documents

Patent Document 1: Japanese Translation of PCT International Application Publication No. 1995-504224

Patent Document 2: Japanese Patent Laid-Open No. 11-92507

Patent Document 3: Japanese Patent Laid-Open No. 2005-29704

Non Patent Documents

Non Patent Document 1: Junji Murata et al., "Selective synthesis of fluorinated ethers by addition reaction of alcohols to fluorinated olefins in water", Green Chemistry, 2002, 4, 60-63

SUMMARY

The present disclosure provides a method for producing a fluoropolymer, the method including polymerizing a fluoromonomer in a solvent to produce the fluoropolymer, wherein the solvent contains a fluorine-containing ether compound (1) represented by formula:$R^1$—O—$R^2$ wherein $R^1$ represents a partially fluorinated alkyl group, and $R^2$ represents a non-fluorinated alkyl group, a partially fluorinated alkyl group, or a completely fluorinated alkyl group, and in the solvent, a content of a fluorine-containing olefin compound (2) represented by formula:$R^3$—CF═CF—$R^4$—O—$R^2$ wherein $R^3$ represents H, F, a partially fluorinated alkyl group, or a completely fluorinated alkyl group, $R^4$ represents a single bond, a partially fluorinated alkylene group, or a completely fluorinated alkylene group, and $R^2$ is the same as described above, is 1.00% by mass or less based on a content of the fluorine-containing ether compound (1).

Effects

The present disclosure may provide a method for producing a fluoropolymer, the method being capable of producing a high-molecular-weight fluoropolymer and having a low impact on the environment.

DESCRIPTION OF EMBODIMENTS

Hereinafter, specific embodiments of the present disclosure will be described in detail, but the present disclosure is not limited to the following embodiments.

Among fluorinated solvents which are used in polymerizing a fluoromonomer, hydrofluoroethers (HFEs) and hydrofluorocarbons (HFCs) have attracted attention as substitutes for perfluorocarbons (PFCs), chlorofluorocarbons (CFCs), and hydrochlorofluorocarbons (HCFCs) because of their low global warming potential (GWP) and low ozone depletion potential (ODP).

However, when the HFE, which has a low global warming potential, is used for the polymerization of a fluoromonomer, problems have been found that a fluoropolymer having physical properties equivalent to those of products produced by conventional methods is not obtained, such as a problem that the molecular weight of the resultant fluoropolymer cannot be made sufficiently high. In addition, there has been a problem that the production of the HFE requires special steps, such as fluorination, which increases the cost.

The present inventors have found that when the HFE, which may be produced relatively inexpensively, is used as the solvent in polymerizing a fluoromonomer, a fluorine-containing olefin compound produced in the process of producing the HFE, the fluorine-containing olefin compound having a particular structure, inhibits the appearance of physical properties equivalent to those of products produced by conventional methods. Further, the present inventors have also found that by reducing the amount of this fluorine-containing olefin compound in the HFE to a particular amount or less, the molecular weight of the resultant fluoropolymer is made high.

The present disclosure relates to a production method completed based on this knowledge and relates to a production method capable of producing a high-molecular-weight fluoropolymer by using a solvent containing a fluorine-containing ether compound in which the content of a fluorine-containing olefin compound having a particular structure is reduced, the production method having a low impact on the environment.

In the production method of the present disclosure, a solvent containing a fluorine-containing ether compound (1) is used in producing a fluoropolymer by polymerizing a fluoromonomer.

The fluorine-containing ether compound (1) is represented by formula: $R^1—O—R^2$ wherein $R^1$ represents a partially fluorinated alkyl group, and $R^2$ represents a non-fluorinated alkyl group, a partially fluorinated alkyl group, or a completely fluorinated alkyl group.

Such a fluorine-containing ether compound is usually synthesized by subjecting an alcohol and a fluorine-containing olefin to a coupling reaction in the presence of a basic compound as a catalyst. Since the basic compound is present in this reaction, a side reaction in which hydrogen fluoride is eliminated from the produced fluorine-containing ether compound is likely to progress simultaneously, and this side reaction produces a by-product, for example, a fluorine-containing olefin compound (2) represented by formula: $R^3—CF{=}CF—R^4—O—R^2$ wherein $R^3$ represents H, F, a partially fluorinated alkyl group, or a completely fluorinated alkyl group, $R^4$ represents a single bond, a partially fluorinated alkylene group, or a completely fluorinated alkylene group, and $R^2$ is the same as described above.

In some embodiments, the solvent to be used in the production method of the present disclosure is one containing the fluorine-containing olefin compound (2), or one not containing the fluorine-containing olefin compound (2), as long as the solvent contains the fluorine-containing ether compound (1); but when the solvent contains the fluorine-containing olefin compound (2), a solvent in which the content of the fluorine-containing ether compound (2) is 1.00% by mass or less based on the content of the fluorine-containing ether compound (1) in the solvent is used. In the production method of the present disclosure, a solvent which contains the fluorine-containing ether compound (1) and in which the content of the fluorine-containing olefin compound (2) is reduced to 1.00% by mass or less based on the content of the fluorine-containing ether compound (1) is used, and therefore a high-molecular-weight fluoropolymer may be produced.

The content of the fluorine-containing olefin compound (2) in the solvent is 1.00% by mass or less, preferably 0.10% by mass or less, and still more preferably 0.01% by mass or less, based on the content of the fluorine-containing ether compound (1). In some embodiments, the lower limit value of the content of the fluorine-containing olefin compound (2) in the solvent is 0% by mass, 0.0001% by mass, 0.0003% by mass, or 0.0005% by mass, based on the content of the fluorine-containing ether compound (1). When a small amount of the fluorine-containing olefin compound (2) is contained in the solvent, but the content of the fluorine-containing olefin compound (2) is sufficiently small, a high-molecular-weight fluoropolymer may be produced. When the content of the fluorine-containing olefin compound (2) is too large, lowering of the polymerization rate and lowering of the molecular weight occur.

The content of the fluorine-containing olefin compound (2) in the solvent is 0.50% by mass or less, preferably 0.05% by mass or less, and still more preferably 0.005% by mass or less, based on the amount of the solvent. In some embodiments, the lower limit value of the content of the fluorine-containing olefin compound (2) in the solvent is 0% by mass, 0.0001% by mass, 0.0003% by mass, or 0.0005% by mass, based on the amount of the solvent.

The content of the fluorine-containing olefin compound (2) in the solvent may be measured by gas chromatography (GC).

In formula: $R^1—O—R^2$ that represents the fluorine-containing ether compound (1), $R^1$ represents a partially fluorinated alkyl group. The partially fluorinated alkyl group refers to an alkyl group in which part of hydrogen atoms each bonded to a carbon atom which forms the alkyl group is substituted with a fluorine atom, but all the hydrogen atoms are not substituted.

$R^1$ preferably has a carbon number of 1 to 6, more preferably 2 to 5, still more preferably 2 to 4, particularly preferably 3 or 4, and most preferably 3.

$R^1$ is preferably a group represented by formula: $X—Rf^1—CFH—Rf^2—$ wherein X represents H, F, a non-fluorinated alkyl group, a partially fluorinated alkyl group, or a completely fluorinated alkyl group, $Rf^1$ and $Rf^2$ are the same or different and each represent a single bond or a completely fluorinated alkylene group while excluding the case where both $Rf^1$ and $Rf^2$ are single bonds, $R^1$ is more preferably a group represented by formula: $X—Rf^1—CFH—CF_2—$ wherein X represents H, F, a non-fluorinated alkyl group, a partially fluorinated alkyl group, or a completely fluorinated alkyl group, and $Rf^1$ represents a single bond or a completely fluorinated alkylene group, and $R^1$ is still more preferably a group represented by formula: $F—CF_2—CFH—CF_2—$.

$R^2$ represents a non-fluorinated alkyl group, a partially fluorinated alkyl group, or a completely fluorinated alkyl group. The non-fluorinated alkyl group refers to an alkyl group not containing a fluorine atom. The completely fluorinated alkyl group refers to an alkyl group in which all the hydrogen atoms each bonded to a carbon atom which forms the alkyl group are substituted with a fluorine atom, the alkyl group not containing a C—H bond. $R^2$ is preferably a non-fluorinated alkyl group or a partially fluorinated alkyl group.

$R^2$ preferably has a carbon number of 1 to 7, more preferably 1 to 3, and still more preferably 1.

$R^2$ is preferably a non-fluorinated or partially fluorinated alkyl group having a carbon number of 1 to 7, more preferably a non-fluorinated or partially fluorinated alkyl group having a carbon number of 1 to 3, and still more preferably $CH_3$.

Examples of the fluorine-containing ether compound (1) include $CF_2HCF_2OR^2$, $CF_3CFHCF_2OR^2$, $CF_3CF_2CFHCF_2OR^2$, $CF_3CF_2CF_2CFHCF_2OR^2$, and $CF_3CF_2CF_2CF_2CFHCF_2OR^2$, wherein $R^2$ is the same as described above.

The fluorine-containing ether compound (1) is preferably at least one compound selected from the group consisting of $CF_2HCF_2OCH_2CH_3$, $CF_2HCF_2OCH_2CH_2CH_3$, $CF_2HCF_2OCH_2CH_2CH_2CH_3$, $CF_2HCF_2OCH_2CH_2CH_2CH_2CH_3$, $CF_2HCF_2OCH_2CH_2CH_2CH_2CH_2CH_3$, $CF_2HCF_2OCH_2CH_2CH_2CH_2CH_2CH_2CH_3$, $CF_2HCF_2OCH_2CF_3$, $CF_2HCF_2OCH_2CF_2CF_3$, $CF_2HCF_2OCH_2CF_2CF_2CF_3$, $CF_2HCF_2OCH_2CF_2CF_2CF_2CF_3$, $CF_2HCF_2OCH_2CF_2CF_2CF_2CF_2CF_3$, $CF_2HCF_2OCH_2CF_2CF_2CF_2CF_2CF_2CF_3$, $CF_3CFHCF_2OCH_3$, $CF_3CFHCF_2OCH_2CH_3$, $CF_3CFHCF_2OCH_2CH_2CH_3$, $CF_3CFHCF_2OCH_2CH_2CH_2CH_3$, $CF_3CFHCF_2OCH_2CH_2CH_2CH_2CH_3$, $CF_3CFHCF_2OCH_2CH_2CH_2CH_2CH_2CH_3$, $CF_3CFHCF_2OCH_2CH_2CH_2CH_2CH_2CH_2CH_3$, $CF_3CFHCF_2OCH_2CF_3$, $CF_3CFHCF_2OCH_2CF_2CF_3$, $CF_3CFHCF_2OCH_2CF_2CF_2CF_3$, $CF_3CFHCF_2OCH_2CF_2CF_2CF_2CF_3$, $CF_3CFHCF_2OCH_2CF_2CF_2CF_2CF_2CF_3$, $CF_3CFHCF_2OCH_2CF_2CF_2CF_2CF_2CF_2CF_3$, $CF_3CF_2CFHCF_2OCH_3$, $CF_3CF_2CFHCF_2OCH_2CH_3$, $CF_3CF_2CFHCF_2OCH_2CH_2CH_3$, $CF_3CF_2CFHCF_2OCH_2CH_2CH_2CH_3$, $CF_3CF_2CFHCF_2OCH_2CH_2CH_2CH_2CH_3$, $CF_3CF_2CFHCF_2OCH_2CH_2CH_2CH_2CH_2CH_3$, $CF_3CF_2CFHCF_2OCH_2CH_2CH_2CH_2CH_2CH_2CH_3$, $CF_3CF_2CFHCF_2OCH_2CF_3$, $CF_3CF_2CFHCF_2OCH_2CF_2CF_3$, $CF_3CF_2CFHCF_2OCH_2CF_2CF_2CF_3$, $CF_3CF_2CFHCF_2OCH_2CF_2CF_2CF_2CF_3$, $CF_3CF_2CFHCF_2OCH_2CF_2CF_2CF_2CF_2CF_3$, $CF_3CF_2CFHCF_2OCH_2CF_2CF_2CF_2CF_2CF_2CF_3$, $CF_3CF_2CF_2CFHCF_2OCH_3$, $CF_3CF_2CF_2CFHCF_2OCH_2CH_3$, $CF_3CF_2CF_2CFHCF_2OCH_2CH_2CH_3$, $CF_3CF_2CF_2CFHCF_2OCH_2CH_2CH_2CH_3$, $CF_3CF_2CF_2CFHCF_2OCH_2CH_2CH_2CH_2CH_3$, $CF_3CF_2CF_2CFHCF_2OCH_2CH_2CH_2CH_2CH_2CH_3$, $CF_3CF_2CF_2CFHCF_2OCH_2CH_2CH_2CH_2CH_2CH_2CH_3$, $CF_3CF_2CF_2CFHCF_2OCH_2CF_3$, $CF_3CF_2CF_2CFHCF_2OCH_2CF_2CF_3$, $CF_3CF_2CF_2CFHCF_2OCH_2CF_2CF_2CF_3$, $CF_3CF_2CF_2CFHCF_2OCH_2CF_2CF_2CF_2CF_3$, $CF_3CF_2CF_2CFHCF_2OCH_2CF_2CF_2CF_2CF_2CF_3$, $CF_3CF_2CF_2CFHCF_2OCH_2CF_2CF_2CF_2CF_2CF_2CF_3$, $CF_3CF_2CF_2CF_2CFHCF_2OCH_3$, $CF_3CF_2CF_2CF_2CFHCF_2OCH_2CH_3$, $CF_3CF_2CF_2CF_2CFHCF_2OCH_2CH_2CH_3$, $CF_3CF_2CF_2CF_2CFHCF_2OCH_2CH_2CH_2CH_3$, $CF_3CF_2CF_2CF_2CFHCF_2OCH_2CH_2CH_2CH_2CH_3$, $CF_3CF_2CF_2CF_2CFHCF_2OCH_2CH_2CH_2CH_2CH_2CH_3$, $CF_3CF_2CF_2CF_2CFHCF_2OCH_2CH_2CH_2CH_2CH_2CH_2CH_3$, $CF_3CF_2CF_2CF_2CFHCF_2OCH_2CF_3$, $CF_3CF_2CF_2CF_2CFHCF_2OCH_2CF_2CF_3$, $CF_3CF_2CF_2CF_2CFHCF_2OCH_2CF_2CF_2CF_3$, $CF_3CF_2CF_2CF_2CFHCF_2OCH_2CF_2CF_2CF_2CF_3$, $CF_3CF_2CF_2CF_2CFHCF_2OCH_2CF_2CF_2CF_2CF_2CF_3$, and $CF_3CF_2CF_2CF_2CFHCF_2OCH_2CF_2CF_2CF_2CF_2CF_2CF_3$.

In formula: $R^3—CF=CF—R^4—O—R^2$ that represents the fluorine-containing olefin compound (2), $R^3$ represents H, F, a partially fluorinated alkyl group, or a completely fluorinated alkyl group.

The partially fluorinated alkyl group and completely fluorinated alkyl group as $R^3$ preferably have a carbon number of 1 to 4, more preferably 1. $R^3$ is preferably H, F, or $CF_3$.

$R^4$ represents a single bond, a partially fluorinated alkylene group, or a completely fluorinated alkylene group.

The partially fluorinated alkylene group and completely fluorinated alkylene group as $R^4$ preferably have a carbon number of 1 to 4, more preferably 1. $R^4$ is preferably a single bond or $CF_2$.

Examples of the fluorine-containing olefin compound (2) include $CF_2=CFCF_2OR^2$, $CF_3CF=CFOR^2$, $CF_3CF=CFCF_2OR^2$, $CF_3CF_2CF=CFOR^2$, $CF_3CF_2CF=CFCF_2OR^2$, $CF_3CF_2CF_2CF=CFOR^2$, $CF_3CF_2CF_2CF=CFCF_2OR^2$, and $CF_3CF_2CF_2CF_2CF=CFOR^2$, wherein $R^2$ is the same as described above.

The fluorine-containing olefin compound (2) is preferably at least one compound selected from the group consisting of $CF_2=CFCF_2OCH_3$, $CF_2=CFCF_2OCH_2CH_3$, $CF_2=CFCF_2OCH_2CH_2CH_3$, $CF_2=CFCF_2OCH_2CH_2CH_2CH_3$, $CF_2=CFCF_2OCH_2CH_2CH_2CH_2CH_3$, $CF_2=CFCF_2OCH_2CH_2CH_2CH_2CH_2CH_3$, $CF_2=CFCF_2OCH_2CH_2CH_2CH_2CH_2CH_2CH_3$, $CF_2=CFCF_2OCH_2CF_3$, $CF_2=CFCF_2OCH_2CF_2CF_3$, $CF_2=CFCF_2OCH_2CF_2CF_2CF_3$, $CF_2=CFCF_2OCH_2CF_2CF_2CF_2CF_3$, $CF_2=CFCF_2OCH_2CF_2CF_2CF_2CF_2CF_3$, $CF_2=CFCF_2OCH_2CF_2CF_2CF_2CF_2CF_2CF_3$, $CF_3CF=CFOCH_3$, $CF_3CF=CFOCH_2CH_3$, $CF_3CF=CFOCH_2CH_2CH_3$, $CF_3CF=CFOCH_2CH_2CH_2CH_3$, $CF_3CF=CFOCH_2CH_2CH_2CH_2CH_3$, $CF_3CF=CFOCH_2CH_2CH_2CH_2CH_2CH_3$, $CF_3CF=CFOCH_2CH_2CH_2CH_2CH_2CH_2CH_3$, $CF_3CF=CFOCH_2CF_3$, $CF_3CF=CFOCH_2CF_2CF_3$, $CF_3CF=CFOCH_2CF_2CF_2CF_3$, $CF_3CF=CFOCH_2CF_2CF_2CF_2CF_3$, $CF_3CF=CFOCH_2CF_2CF_2CF_2CF_2CF_3$, $CF_3CF=CFOCH_2CF_2CF_2CF_2CF_2CF_2CF_3$, $CF_3CF=CFCF_2OCH_3$, $CF_3CF=CFCF_2OCH_2CH_3$, $CF_3CF=CFCF_2OCH_2CH_2CH_3$, $CF_3CF=CFCF_2OCH_2CH_2CH_2CH_3$, $CF_3CF=CFCF_2OCH_2CH_2CH_2CH_2CH_3$, $CF_3CF=CFCF_2OCH_2CH_2CH_2CH_2CH_2CH_3$, $CF_3CF=CFCF_2OCH_2CH_2CH_2CH_2CH_2CH_2CH_3$, $CF_3CF=CFCF_2OCH_2CF_3$, $CF_3CF=CFCF_2OCH_2CF_2CF_3$, $CF_3CF=CFCF_2OCH_2CF_2CF_2CF_3$, $CF_3CF=CFCF_2OCH_2CF_2CF_2CF_2CF_3$, $CF_3CF=CFCF_2OCH_2CF_2CF_2CF_2CF_2CF_3$, $CF_3CF=CFCF_2OCH_2CF_2CF_2CF_2CF_2CF_2CF_3$, $CF_3CF_2CF=CFOCH_3$, $CF_3CF_2CF=CFOCH_2CH_3$, $CF_3CF_2CF=CFOCH_2CH_2CH_3$, $CF_3CF_2CF=CFOCH_2CH_2CH_2CH_3$, $CF_3CF_2CF=CFOCH_2CH_2CH_2CH_2CH_3$, $CF_3CF_2CF=CFOCH_2CH_2CH_2CH_2CH_2CH_3$, $CF_3CF_2CF=CFOCH_2CH_2CH_2CH_2CH_2CH_2CH_3$, $CF_3CF_2CF=CFOCH_2CF_3$, $CF_3CF_2CF=CFOCH_2CF_2CF_3$, $CF_3CF_2CF=CFOCH_2CF_2CF_2CF_3$, $CF_3CF_2CF=CFOCH_2CF_2CF_2CF_2CF_3$, $CF_3CF_2CF=CFOCH_2CF_2CF_2CF_2CF_2CF_3$, $CF_3CF_2CF=CFOCH_2CF_2CF_2CF_2CF_2CF_2CF_3$, $CF_3CF_2CF=CFCF_2OCH_3$, $CF_3CF_2CF=CFCF_2OCH_2CH_3$, $CF_3CF_2CF=CFCF_2OCH_2CH_2CH_3$, $CF_3CF_2CF=CFCF_2OCH_2CH_2CH_2CH_3$, $CF_3CF_2CF=CFCF_2OCH_2CH_2CH_2CH_2CH_3$, $CF_3CF_2CF=CFCF_2OCH_2CH_2CH_2CH_2CH_2CH_3$, $CF_3CF_2CF=CFCF_2OCH_2CH_2CH_2CH_2CH_2CH_2CH_3$, $CF_3CF_2CF=CFCF_2OCH_2CF_3$, $CF_3CF_2CF=CFCF_2OCH_2CF_2CF_3$, $CF_3CF_2CF=CFCF_2OCH_2CF_2CF_2CF_3$, $CF_3CF_2CF=CFCF_2OCH_2CF_2CF_2CF_2CF_3$, $CF_3CF_2CF=CFCF_2OCH_2CF_2CF_2CF_2CF_2CF_3$, $CF_3CF_2CF=CFCF_2OCH_2CF_2CF_2CF_2CF_2CF_2CF_3$, $CF_3CF_2CF_2CF=CFOCH_3$, $CF_3CF_2CF_2CF=CFOCH_2CH_3$, $CF_3CF_2CF_2CF=CFOCH_2CH_2CH_3$, $CF_3CF_2CF_2CF=CFOCH_2CH_2CH_2CH_3$, $CF_3CF_2CF_2CF{=}CFOCH_2CH_2CH_2CH_2CH_3$, $CF_3CF_2CF_2CF{=}CFOCH_2CH_2CH_2CH_2CH_2CH_3$, $CF_3CF_2CF_2CF{=}CFOCH_2CH_2CH_2CH_2CH_2CH_2CH_3$, $CF_3CF_2CF_2CF{=}CFOCH_2CF_3$, $CF_3CF_2CF_2CF{=}CFOCH_2CF_2CF_3$, $CF_3CF_2CF_2CF{=}CFOCH_2CF_2CF_2CF_3$, $CF_3CF_2CF_2CF{=}CFOCH_2CF_2CF_2CF_2CF_3$, $CF_3CF_2CF_2CF{=}CFOCH_2CF_2CF_2CF_2CF_2CF_3$, $CF_3CF_2CF_2CF{=}CFOCH_2CF_2CF_2CF_2CF_2CF_2CF_3$, $CF_3CF_2CF_2CF{=}CFCF_2OCH_3$, $CF_3CF_2CF_2CF{=}CFCF_2OCH_2CH_3$, $CF_3CF_2CF_2CF{=}CFCF_2OCH_2CH_2CH_3$, $CF_3CF_2CF_2CF{=}CFCF_2OCH_2CH_2CH_2CH_3$, $CF_3CF_2CF_2CF{=}CFCF_2OCH_2CH_2CH_2CH_2CH_3$, $CF_3CF_2CF_2CF{=}CFCF_2OCH_2CH_2CH_2CH_2CH_2CH_3$, $CF_3CF_2CF_2CF{=}CFCF_2OCH_2CH_2CH_2CH_2CH_2CH_2CH_3$, $CF_3CF_2CF_2CF{=}CFCF_2OCH_2CF_3$, $CF_3CF_2CF_2CF{=}CFCF_2OCH_2CF_2CF_3$, $CF_3CF_2CF_2CF{=}CFCF_2OCH_2CF_2CF_2CF_3$, $CF_3CF_2CF_2CF{=}CFCF_2OCH_2CF_2CF_2CF_2CF_3$, $CF_3CF_2CF_2CF{=}CFCF_2OCH_2CF_2CF_2CF_2CF_2CF_3$, $CF_3CF_2CF_2CF{=}CFCF_2OCH_2CF_2CF_2CF_2CF_2CF_2CF_3$, $CF_3CF_2CF_2CF_2CF{=}CFOCH_3$, $CF_3CF_2CF_2CF_2CF{=}CFOCH_2CH_3$, $CF_3CF_2CF_2CF_2CF{=}CFOCH_2CH_2CH_3$, $CF_3CF_2CF_2CF_2CF{=}CFOCH_2CH_2CH_2CH_3$, $CF_3CF_2CF_2CF_2CF{=}CFOCH_2CH_2CH_2CH_2CH_3$, $CF_3CF_2CF_2CF_2CF{=}CFOCH_2CH_2CH_2CH_2CH_2CH_3$, $CF_3CF_2CF_2CF_2CF{=}CFOCH_2CH_2CH_2CH_2CH_2CH_2CH_3$, $CF_3CF_2CF_2CF_2CF{=}CFOCH_2CF_3$, $CF_3CF_2CF_2CF_2CF{=}CFOCH_2CF_2CF_3$, $CF_3CF_2CF_2CF_2CF{=}CFOCH_2CF_2CF_2CF_3$, $CF_3CF_2CF_2CF_2CF{=}CFOCH_2CF_2CF_2CF_2CF_3$, $CF_3CF_2CF_2CF_2CF{=}CFOCH_2CF_2CF_2CF_2CF_2CF_3$, and $CF_3CF_2CF_2CF_2CF{=}CFOCH_2CF_2CF_2CF_2CF_2CF_2CF_3$.

In one embodiment of the present disclosure, a solvent containing a fluorine-containing ether compound (1-1) represented by formula: $X—Rf^1—CFH—Rf^2—O—R^2$ wherein X represents H, F, a non-fluorinated alkyl group, a partially fluorinated alkyl group, or a completely fluorinated alkyl group, $Rf^1$ and $Rf^2$ are the same or different and each represent a single bond or a completely fluorinated alkylene group while excluding the case where both $Rf^1$ and $Rf^2$ are single bonds, and $R^2$ is the same as described above, is used as the fluorine-containing ether compound (1).

X represents H, F, a non-fluorinated alkyl group, a partially fluorinated alkyl group, or a completely fluorinated alkyl group. The non-fluorinated alkyl group, partially fluorinated alkyl group, and completely fluorinated alkyl group as X preferably have a carbon number of 1 to 4, more preferably 1. X is preferably H or F, more preferably F.

$Rf^1$ represents a single bond or a completely fluorinated alkylene group. The completely fluorinated alkylene group as $Rf^1$ preferably has a carbon number of 1 to 4, more preferably 1 or 2, and still more preferably 1. $Rf^1$ is preferably a single bond, $—CF_2—$, or $—CF_2CF_2—$, more preferably $—CF_2—$.

$Rf^2$ represents a single bond or a completely fluorinated alkylene group. The completely fluorinated alkylene group as $Rf^2$ preferably has a carbon number of 1 to 4, more preferably 1. $Rf^2$ is preferably a single bond or $—CF_2—$.

When the solvent contains the fluorine-containing ether compound (1-1), the fluorine-containing olefin compound (2) is preferably a fluorine-containing olefin compound (2-1-1) represented by formula: $X—Rf^1—CF{=}CF—Rf^{21}—O—R^2$ wherein X, $Rf^1$, and $R^2$ are the same as described above, and $Rf^{21}$ represents a single bond or a completely fluorinated alkylene group having a carbon number smaller by one than that of $Rf^2$, or a fluorine-containing olefin compound (2-1-2) represented by formula: $X—Rf^{11}—CF{=}CF—Rf^2—O—R^2$ wherein X, $Rf^2$, and $R^2$ are the same as described above, and $Rf^{11}$ represents a single bond or a completely fluorinated alkylene group having a carbon number smaller by one than that of $Rf^1$.

The fluorine-containing olefin compound (2-1-1) and fluorine-containing olefin compound (2-1-2) are usually produced by acting a basic compound on the fluorine-containing ether compound (1-1) to eliminate hydrogen fluoride from the fluorine-containing ether compound (1-1).

In one embodiment of the present disclosure, a solvent containing a fluorine-containing ether compound (1-2) represented by formula: $X—Rf^1—CFH—CF_2—O—R^2$ wherein X represents H, F, a non-fluorinated alkyl group, a partially fluorinated alkyl group, or a completely fluorinated alkyl group, $Rf^1$ represents a single bond or a completely fluorinated alkylene group, and $R^2$ is the same as described above, is used as the fluorine-containing ether compound (1).

When the solvent contains the fluorine-containing ether compound (1-2), the fluorine-containing olefin compound (2) is preferably a fluorine-containing olefin compound (2-2-1) represented by formula: $X—Rf^1—CF{=}CF—O—R^2$ wherein X, $Rf^1$, and $R^2$ are the same as described above, or a fluorine-containing olefin compound (2-2-2) represented by formula: $X—Rf^{11}—CF{=}CF—CF_2—O—R^2$ wherein X and $R^2$ are the same as described above, and $Rf^{11}$ represents a single bond or a completely fluorinated alkylene group having a carbon number smaller by one than that of $Rf^1$.

The fluorine-containing olefin compound (2-2-1) and fluorine-containing olefin compound (2-2-2) are usually produced by acting a basic compound on the fluorine-containing ether compound (1-2) to eliminate hydrogen fluoride from the fluorine-containing ether compound (1-2).

In one embodiment of the present disclosure, a solvent containing a fluorine-containing ether compound (1-3) represented by formula: $F—CF_2—CFH—CF_2—O—R^2$ wherein $R^2$ is the same as described above, is used as the fluorine-containing ether compound (1).

When the solvent contains the fluorine-containing ether compound (1-3), the fluorine-containing olefin compound (2) is preferably a fluorine-containing olefin compound (2-3-1) represented by formula: $F—CF_2—CF{=}CF—O—R^2$ wherein $R^2$ is the same as described above, or a fluorine-containing olefin compound (2-3-2) represented by formula: $F—CF{=}CF—CF_2—O—R^2$ wherein $R^2$ is the same as described above.

The fluorine-containing olefin compound (2-3-1) and fluorine-containing olefin compound (2-3-2) are usually produced by acting a basic compound on the fluorine-containing ether compound (1-3) to eliminate hydrogen fluoride from the fluorine-containing ether compound (1-3).

The fluorine-containing ether compound (1) preferably has a boiling point of 0 to 150° C., more preferably 10 to 100° C., still more preferably 20 to 90° C., and particularly preferably 25 to 80° C. because the polymerization progresses smoothly, a high-molecular-weight fluoropolymer may be produced, and the fluoropolymer after the polymerization and the fluorine-containing ether compound (1) may smoothly be separated.

In some embodiments, the solvent which is used in the production method of the present disclosure contains, together with the fluorine-containing ether compound (1), a solvent other than the fluorine-containing ether compound (1). Examples of another solvent include water, non-fluorine-containing organic solvents, such as alcohols, ketones, esters, and hydrocarbon compounds, and fluorine-containing organic solvents other than the fluorine-containing ether compound (1).

The content of the fluorine-containing ether compound (1) in the solvent is preferably 10 to 100% by mass, more preferably 20% by mass or more, and still more preferably 25% by mass or more, and is more preferably 80% by mass or less, and still more preferably 75% by mass or less, based on the amount of the solvent.

The method for adding the solvent to the reaction system is not limited, and in some embodiments, the solvent is added into a reactor to be used for polymerization before starting the polymerization, or the raw materials, such as a polymerization initiator, to be used for polymerization, are dissolved in the solvent to prepare a composition, and then the prepared composition containing the raw materials and the solvent is added into the reactor. In some embodiments, the solvent is used as a polymerization solvent or as an initiator solvent.

In the production method of the present disclosure, a fluoromonomer is polymerized in the solvent to produce a fluoropolymer. Suitably, the fluoromonomer is different from the fluorine-containing olefin compound (2), the fluorine-containing olefin compound (2-1-1), the fluorine-containing olefin compound (2-1-2), the fluorine-containing olefin compound (2-2-1), the fluorine-containing olefin compound (2-2-2), the fluorine-containing olefin compound (2-3-1), or the fluorine-containing olefin compound (2-3-2).

Examples of the fluoromonomer include fluoroolefins, preferably fluoroolefins having 2 to 10 carbon atoms; fluorinated cyclic monomers; fluorinated alkyl vinyl ethers represented by formula $CQ_2{=}CQOR^1$ or $CQ_2{=}CQOR^2OR^3$ wherein Q is H or F, $R^1$ and $R^3$ are each an alkyl group in which part or all of the hydrogen atoms are substituted with a fluorine atom, the alkyl group having a carbon number of 1 to 8, and $R^2$ is an alkylene group in which part or all of the hydrogen atoms are substituted with a fluorine atom, the alkylene group having a carbon number of 1 to 8; fluorine-containing olefins having a nitrile group; and fluorine-containing vinyl ethers having a nitrile group.

More specifically, the fluoromonomer is preferably at least one selected from the group consisting of tetrafluoroethylene [TFE], hexafluoropropylene [HFP], chlorotrifluoroethylene [CTFE], vinyl fluoride [VF], vinylidene fluoride [VdF], trifluoroethylene, hexafluoroisobutylene, monomers represented by $CH_2{=}CZ^1(CF_2)_nZ^2$ wherein $Z^1$ is H or F, $Z^2$ is H, F, or Cl, and n is an integer of 1 to 10, perfluoro(alkyl vinyl ethers) [PAVEs] represented by $CF_2{=}CF{-}ORf^6$ wherein $Rf^6$ represents a perfluoroalkyl group having a carbon number of 1 to 8, alkyl perfluorovinyl ether derivatives represented by $CF_2{=}CF{-}O{-}CH_2{-}Rf^7$ wherein $Rf^7$ is a perfluoroalkyl group having a carbon number of 1 to 5, perfluoro-2,2-dimethyl-1,3-dioxole [PDD], and perfluoro-2-methylene-4-methyl-1,3-dioxolane [PMD].

Examples of the monomers represented by $CH_2{=}CZ^1(CF_2)_nZ^2$ include $CH_2{=}CFCF_3$, $CH_2{=}CH{-}C_4F_9$, $CH_2{=}CHC_6F_{13}$, and $CH_2{=}CF{-}C_3F_6H$.

Examples of the perfluoro(alkyl vinyl ethers) represented by $CF_2{=}CF{-}ORf^6$ include $CH_2{=}CF{-}OCF_3$, $CH_2{=}CF{-}OCF_2CF_3$, and $CF_2{=}CF{-}OCF_2CF_2CF_3$.

In the production method of the present disclosure, the fluoromonomer is preferably at least one selected from the group consisting of at least tetrafluoroethylene, chlorotrifluoroethylene, and vinylidene fluoride because the polymerization progresses smoothly and a fluoropolymer having a further higher molecular weight may be produced.

In some embodiments, a non-fluorine-containing monomer is polymerized in addition to the fluoromonomer. Examples of the non-fluorine-containing monomer include hydrocarbon-based monomers reactive with the fluoromonomer. Examples of the hydrocarbon-based monomers include alkenes, such as ethylene, propylene, butylene, and isobutylene; alkyl vinyl ethers, such as ethyl vinyl ether, propyl vinyl ether, butyl vinyl ether, isobutyl vinyl ether, and cyclohexyl vinyl ether; vinyl esters, such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, vinyl monochloroacetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers, such as ethyl allyl ether, propyl allyl ether, butyl allyl ether, isobutyl allyl ether, and cyclohexyl allyl ether; and alkyl allyl esters, such as ethyl allyl ester, propyl allyl ester, butyl allyl ester, isobutyl allyl ester, and cyclohexyl allyl ester.

In some embodiments, the non-fluorine-containing monomer is also a functional group-containing hydrocarbon-based monomer. Examples of the functional group-containing hydrocarbon-based monomer include hydroxyalkyl vinyl ethers, such as hydroxyethyl vinyl ether, hydroxypropyl vinyl ether, hydroxybutyl vinyl ether, hydroxyisobutyl vinyl ether, and hydroxycyclohexyl vinyl ether; non-fluorine-containing monomers having a glycidyl group, such as glycidyl vinyl ether and glycidyl allyl ether;

- non-fluorine-containing monomers having an amino group, such as aminoalkyl vinyl ethers and aminoalkyl allyl ethers;
- non-fluorine-containing monomers having an amide group, such as (meth)acrylamide and methylolacrylamide;
- bromine-containing olefins, iodine-containing olefins, bromine-containing vinyl ethers, and iodine-containing vinyl ethers;
- non-fluorine-containing monomers having a nitrile group;
- unsaturated dicarboxylic acids and anhydrides thereof, such as itaconic acid, itaconic anhydride, citraconic acid, citraconic anhydride, 5-norbornene-2,3-dicarboxylic anhydride, and maleic anhydride;

hydroxyalkyl (meth)acrylates, such as hydroxyethyl acrylate and 2-hydroxypropyl acrylate;

alkylidene malonic acid esters, such as dimethyl methylidenemalonate;

vinyl carboxyalkyl ethers, such as vinyl carboxymethyl ether and vinyl carboxyethyl ether;

carboxyalkyl (meth)acrylates, such as 2-carboxyethyl acrylate and 2-carboxyethyl methacrylate;

(meth)acryloyloxyalkyl dicarboxylic acid esters, such as acryloyloxyethyl succinate, acryloyloxypropyl succinate, methacryloyloxyethyl succinate, acryloyloxyethyl phthalate, and methacryloyloxyethyl phthalate;

unsaturated dibasic acid monoesters, such as maleic acid monomethyl ester, maleic acid monoethyl ester, citraconic acid monomethyl ester, and citraconic acid monoethyl ester; and a monomer (11) represented by $$\text{formula:}R^{11}R^{12}C{=}CR^{13}{-}R^{14}{-}COOY^{11}$$

wherein $R^{11}$ to $R^{13}$ each independently represent a hydrogen atom or a hydrocarbon group having a carbon number of 1 to 8, $R^{14}$ represents a single bond or a hydrocarbon group having a carbon number of 1 to 8, and $Y^{11}$ represents an inorganic cation and/or an organic cation.

$Y^{11}$ represents an inorganic cation and/or an organic cation. Examples of the inorganic cation include cations such as H, Li, Na, K, Mg, Ca, Al, and Fe. Examples of the organic cations include cations such as $NH_4$, $NH_3R^{15}$, $NH_2R^{15}{}_2$, $NHR^{15}{}_3$, and $NR^{15}{}_4$, wherein each $R^{15}$ independently represents an alkyl group having a carbon number of 1 to 4. $Y^{11}$ is preferably H, Li, Na, K, Mg, Ca, Al, or $NH_4$, more preferably H, Li, Na, K, Mg, Al, or $NH_4$, still more preferably H, Li, Al, or $NH_4$, and particularly preferably H. Note that the specific examples of the inorganic cation and the organic cation are described abbreviating signs and valences for convenience.

$R^{11}$ to $R^{13}$ each independently represent a hydrogen atom or a hydrocarbon group having a carbon number of 1 to 8. The hydrocarbon group is a monovalent hydrocarbon group. The hydrocarbon group preferably has a carbon number of 4 or less. Examples of the hydrocarbon group include an alkyl group, an alkenyl group, and an alkenyl group each having a carbon number described above, and the hydrocarbon group is preferably a methyl group or an ethyl group. Each of $R^{11}$ and $R^{12}$ is preferably independently a hydrogen atom, a methyl group, or an ethyl group, and $R^{13}$ is preferably a hydrogen atom or a methyl group.

$R^{14}$ represents a single bond or a hydrocarbon group having a carbon number of 1 to 8. The hydrocarbon group is a divalent hydrocarbon group. The hydrocarbon group preferably has a carbon number of 4 or less. Examples of the hydrocarbon group include an alkylene group and an alkenylene group each having a carbon number described above, and among others, the hydrocarbon group is preferably at least one selected from the group consisting of a methylene group, an ethylene group, an ethylidene group, a propylidene group, and an isopropylidene group, more preferably a methylene group.

The monomer (11) is preferably at least one selected from the group consisting of (meth)acrylic acid and salts thereof, vinyl acetate (3-butenoic acid) and salts thereof, 3-pentenoic acid and salts thereof, 4-pentenoic acid and salts thereof, 3-hexenoic acid and salts thereof, 4-heptenoic acid and salts thereof, and 5-hexenoic acid and salts thereof, more preferably at least one selected from the group consisting of 3-butenoic acid and salts thereof, and 4-pentenoic acid and salts thereof.

In the production method of the present disclosure, the embodiment of the polymerization is not limited and is, in some embodiments, solution polymerization, suspension polymerization, emulsion polymerization, or the like. Suspension polymerization is preferable from the viewpoint of enabling smooth production of a high-molecular-weight fluoropolymer. In suspension polymerization, the solvent may be a solvent containing the fluorine-containing ether compound (1) and water.

In the production method of the present disclosure, the polymerization of a fluoromonomer is performed in the presence of a polymerization initiator, a chain transfer agent, a surfactant, a radical scavenger, or the like in some embodiments.

The polymerization initiator may be an oil-soluble radical polymerization initiator or a water-soluble radical polymerization initiator.

In some embodiments, the oil-soluble radical polymerization initiator is a known oil-soluble peroxide, and representative examples thereof include dialkyl peroxycarbonates, such as di-n-propyl peroxydicarbonate, diisopropyl peroxydicarbonate, di-sec-butyl peroxydicarbonate, and di-2-ethoxyethyl peroxydicarbonate;

peroxy esters, such as t-butyl peroxyisobutyrate and t-butyl peroxypivalate;

dialkyl peroxides, such as di-t-butyl peroxide; and di[fluoro(or fluorochloro)acyl] peroxides.

Examples of the di[fluoro(or fluorochloro)acyl]peroxides include a diacyl peroxide represented by $[(RfCOO){-}]_2$ wherein Rf represents a perfluoroalkyl group, an ω-hydroperfluoroalkyl group, or a fluorochloroalkyl group.

Examples of the di[fluoro(or fluorochloro)acyl]peroxides include di(ω-hydro-dodecafluorohexanoyl) peroxide, di(ω-hydro-tetradecafluoroheptanoyl) peroxide, di(ω-hydrohexadecafluorononanoyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide, and di(undecachlorotriacontafluorodocosanoyl) peroxide.

In some embodiments, the water-soluble radical polymerization initiator is a known water-soluble peroxide, and examples thereof include ammonium salts, potassium salts, and sodium salts of persulfuric acid, perboric acid, perchloric acid, perphosphoric acid, and percarbonic acid; organic peroxides, such as disuccinic acid peroxide and diglutaric acid peroxide; and t-butyl permaleate and t-butyl hydroperoxide. In some embodiments, a reductant, such as a sulfite, is used in combination with a peroxide, and the use amount thereof is 0.1 to 20 times the amount of the peroxide.

The surfactant may be a known surfactant and may be, for example, a nonionic surfactant, an anionic surfactant, or a cationic surfactant. Among others, the surfactant is preferably a fluorine-containing anionic surfactant, more preferably a linear or branched fluorine-containing anionic surfactant optionally containing etheric oxygen (that is, optionally having an oxygen atom intercalated between carbon atoms) and having a carbon number of 4 to 20. The amount of the surfactant to be added (based on the amount of polymerization water) is preferably 50 to 5,000 ppm.

Examples of the chain transfer agent include hydrocarbons, such as ethane, isopentane, n-hexane, and cyclohexane; aromatics, such as toluene and xylene; ketones, such as acetone; acetic acid esters, such as ethyl acetate and butyl acetate; alcohols, such as methanol and ethanol; mercaptans, such as methyl mercaptan; and halogenated hydrocarbons, such as carbon tetrachloride, chloroform, methylene chloride, and methyl chloride. The amount of the chain transfer agent to be added can vary depending on the chain transfer constant of the compound to be used, but the chain transfer agent is usually used in a range of 0.01 to 20% by mass based on the amount of the polymerization solvent.

The polymerization temperature is preferably 10 to 95° C., more preferably 20° C. or higher, and more preferably 90° C. or lower.

The polymerization pressure is preferably 0.05 to 4.0 MPaG, more preferably 0.1 MPaG or higher, and more preferably 3.0 MPaG or lower.

In the production method of the present disclosure, the polymerization may be performed by charging a fluoromonomer in a polymerization reactor, stirring the contents in the reactor, keeping the temperature of the reactor at a predetermined polymerization temperature, and subsequently adding a polymerization initiator to start the polymerization reaction. In some embodiments, a solvent, an additive, and the like are charged as necessary in the reactor before the polymerization reaction is started. In some embodiments, additional solvent, fluoromonomer, polymerization initiator, chain transfer agent, and the like are added according to the purpose after the polymerization reaction is started.

When a fluoropolymer is produced by suspension polymerization, a slurry of the fluoropolymer is usually provided, and therefore a powder of the fluoropolymer may be provided by recovering the slurry from the reactor, and performing post-treatments, such as cleaning and drying, as desired.

After the fluoropolymer is recovered from the solvent, the residual solvent may be recovered to be reused. In some embodiments, the recovered solvent is treated by the methods such as filtration and purification. The recovered solvent may be utilized as, for example, a solvent for polymerizing the fluoromonomer, and may also be utilized as a solvent to be used in the production method of the present disclosure.

The fluoropolymer may be produced by using the production method of the present disclosure in this way. Suitably, the fluoropolymer provided by the production method of the present disclosure is a fluororesin.

In the present disclosure, the fluororesin refers to a partially crystalline fluoropolymer and is not a fluoroelastomer but a fluoroplastics. The fluororesin has a melting point and has thermoplasticity, but is, in some embodiments, melt-fabricable or non melt-fabricable.

In the present disclosure, being melt-fabricable means that the polymer may be melted to be processed using a conventional processing device, such as an extruder and injection molding machine. Accordingly, the melt-fabricable fluororesin usually has a melt flow rate of 0.01 to 500 g/10 min, measured by the measurement method which will be describe later.

According to the production method of the present disclosure, a high-molecular-weight fluoropolymer may be produced. When the fluoropolymer is a melt-fabricable fluororesin, the molecular weight of the fluoropolymer may be roughly estimated by measuring the melt flow rate of the fluoropolymer. The lower the melt flow rate of the fluoropolymer, the higher the molecular weight of the fluoropolymer.

A fluoropolymer (fluororesin) provided by the production method of the present disclosure preferably has a melt flow rate (MFR) of 80 g/10 min or lower, more preferably 60 g/10 min or lower, and still more preferably 50 g/10 min or lower. Thus, the fluoropolymer is preferably a melt-fabricable fluororesin because it may fully benefit from the advantage of the production method of the present disclosure.

In the present disclosure, the MFR refers to a value obtained, in accordance with ASTM D1238, using a melt indexer (manufactured by Toyo Seiki Seisaku-sho, Ltd.) as a mass (g/10 min) of the polymer that flows out per 10 minutes from a nozzle having an inner diameter of 2 mm and a length of 8 mm at a measurement temperature (for example, 372° C. for PFA and FEP, and 297° C. for ETFE) set according to the type of the fluoropolymer, and a load (for example, 49 N for PFA, FEP, and ETFE) set according to the type of the fluoropolymer.

A fluoropolymer provided by the production method of the present disclosure preferably has a melting point of 110 to 330° C., more preferably 120 to 320° C.

In the present disclosure, the melting point refers to a temperature corresponding to a maximum value in a heat-of-fusion curve obtained when the temperature of the fluoropolymer is increased at a rate of 10° C./min using a differential scanning calorimeter [DSC].

Examples of the melt-fabricable fluororesin include a TFE/PAVE copolymer [PFA], a TFE/HFP copolymer [FEP], an ethylene [Et]/TFE copolymer [ETFE], an Et/TFE/HFP copolymer, polychlorotrifluoroethylene [PCTFE], a TFE/VdF copolymer, a CTFE/TFE copolymer, an Et/CTFE copolymer, and PVF.

The PFA is a copolymer containing TFE unit and a PAVE unit. The PFA is not limited but is preferably a copolymer in which the molar ratio of TFE unit to the PAVE unit (TFE unit/PAVE unit) is 70/30 or more and less than 99.5/0.5. More preferred molar ratio is 70/30 or more and 99.2/0.8 or less, and still more preferred molar ratio is 80/20 or more and 99/1 or less. When the amount of TFE unit is too small, the mechanical properties tend to be lowered, and when the amount of TFE unit is too large, the melting point is made too high and the moldability tends to be lowered. The PFA is also preferably a copolymer in which the amount of a monomer unit derived from a monomer copolymerizable with TFE and the PAVE is 0.1 to 10 mol % and the total amount of TFE unit and the PAVE unit is 90 to 99.9 mol %. Examples of the monomer copolymerizable with TFE and the PAVE include HFP, a vinyl monomer represented by $CZ^3Z^4{=}CZ^5(CF_2)_nZ^6$ wherein $Z^3$, $Z^4$, and $Z^5$ are the same or different and each represent a hydrogen atom or a fluorine atom, $Z^6$ represents a hydrogen atom, a fluorine atom, or a chlorine atom, and n represents an integer of 2 to 10, an alkyl perfluorovinyl ether derivative represented by $CF_2{=}CF{-}OCH_2{-}Rf^7$ wherein $Rf^7$ represents a perfluoroalkyl group having a carbon number of 1 to 5, itaconic acid, itaconic anhydride, citraconic acid, and citraconic anhydride.

The FEP is a copolymer containing TFE unit and HFP unit. The FEP is not limited but is preferably a copolymer in which the molar ratio of TFE unit to HFP unit (TFE unit/HFP unit) is 70/30 or more and less than 95/5. More preferred molar ratio is 70/30 or more and 92/8 or less, and still more preferred molar ratio is 80/20 or more and 91/9 or less. When the amount of TFE unit is too small, the mechanical properties tend to be lowered, and when the amount of TFE unit is too large, the melting point is made too high and the moldability tends to be lowered. The FEP is also preferably a copolymer in which the amount of a monomer unit derived from a monomer copolymerizable with TFE and HFP is 0.1 to 10 mol % and the total amount of TFE unit and HFP unit is 90 to 99.9 mol %. Examples of the monomer copolymerizable with TFE and HFP include the PAVE, and alkyl perfluorovinyl ether derivatives.

The ETFE is a copolymer containing ethylene unit and TFE unit. The ETFE is preferably a copolymer in which the molar ratio of TFE unit to ethylene unit (TFE unit/ethylene unit) is 20/80 or more and 90/10 or less. More preferred molar ratio is 37/63 or more and 85/15 or less, and still more preferred molar ratio is 38/62 or more and 80/20 or less. In some embodiments, the ETFE is a copolymer composed of TFE, ethylene, and a monomer copolymerizable with TFE and ethylene. Examples of the copolymerizable monomer include monomers represented by the following formulas $$CH_2{=}CX^5Rf^3, CF_2{=}CFRf^3, CF_2{=}CFORf^3, \text{ and } CH_2{=}C(Rf^3)_2$$

wherein $X^5$ represents a hydrogen atom or a fluorine atom, and $Rf^3$ represents a fluoroalkyl group optionally containing an ether bond, and among others, preferred copolymerizable monomers are fluorine-containing vinyl monomers represented by $CF_2{=}CFRf^3$, $CF_2{=}CFORf^3$, and $CH_2{=}CX^5Rf^3$, and more preferred copolymerizable monomers are HFP, a perfluoro(alkyl vinyl ether) represented by $CF_2{=}CF{-}ORf^4$ wherein $Rf^4$ represents a perfluoroalkyl group having a carbon number of 1 to 5, and a fluorine-containing vinyl monomer represented by $CH_2{=}CX^5Rf^3$ wherein $Rf^3$ is a fluoroalkyl group having a carbon number of 1 to 8. Further, in some embodiments, the monomer copolymerizable with TFE and ethylene is an aliphatic unsaturated carboxylic acid, such as itaconic acid, itaconic anhydride, 5-norbornene-2,3-dicarboxylic anhydride, or maleic anhydride. The amount of the monomer copolymerizable with TFE and ethylene is preferably 0.1 to 23 mol %, more preferably 0.1 to 15 mol %, and particularly preferably 0.2 to 6 mol %, based on the amount of the fluorine-containing polymer.

It is also one of the preferred embodiments that the ETFE is an Et/TFE/HFP copolymer, and, in some embodiments, the ETFE is a polymer further having a polymerized unit based on an additional fluoromonomer (except for HFP) or a non-fluorinated monomer. The amount of the additional fluoromonomer and the non-fluorinated monomer is preferably 10 mol % or less, more preferably 5 mol % or less, in the whole amount of the polymer. The molar ratio of Et unit:TFE unit:HFP unit:monomer unit based on additional fluoromonomer and non-fluorinated monomer is preferably 30 to 81:3 to 49:10 to 30:0.5 to 10.

The VdF/TFE copolymer is a copolymer containing VdF unit and TFE unit. In the copolymer, the content of VdF unit and TFE unit is preferably 5/95 to 95/5, more preferably 10/90 to 95/5, and still more preferably 20/80 to 90/10, in terms of the molar ratio of VdF unit/TFE unit.

The VdF/TFE copolymer preferably further contains a polymerized unit of an ethylenically unsaturated monomer (except for VdF and TFE). In some embodiments, the content of the polymerized unit of the ethylenically unsaturated monomer is 0 to 50 mol %, 0 to 40 mol %, 0 to 30 mol %, or 0 to 15 mol %, based on the total amount of the polymerized unit.

The ethylenically unsaturated monomer is not limited as long as it is a monomer copolymerizable with VdF and TFE, but is preferably at least one selected from the group consisting of the following compounds.

A monomer represented by $$\text{formula}: CX^6_2{=}CX^6(CF_2)_nX^6$$

wherein $X^6$s are the same or different and each represent H, F, or Cl, n represents an integer of 0 to 8, but VdF and TFE are excluded;

a monomer represented by $$\text{formula}: CF_2{=}CF{-}ORf^8$$

wherein $Rf^8$ represents an alkyl group having a carbon number of 1 to 3 or a fluoroalkyl group having a carbon number of 1 to 3;

hydroxyalkyl (meth)acrylates, such as hydroxyethyl acrylate and 2-hydroxypropyl acrylate;

alkylidene malonic acid esters, such as dimethyl methylidenemalonate;

vinyl carboxyalkyl ethers, such as vinyl carboxymethyl ether and vinyl carboxyethyl ether;

carboxyalkyl (meth)acrylates, such as 2-carboxyethyl acrylate and 2-carboxyethyl methacrylate;

(meth)acryloyloxyalkyl dicarboxylic acid esters, such as acryloyloxyethyl succinate, acryloyloxypropyl succinate, methacryloyloxyethyl succinate, acryloyloxyethyl phthalate, and methacryloyloxyethyl phthalate;

unsaturated dibasic acid monoesters, such as maleic acid monomethyl ester, maleic acid monoethyl ester, citraconic acid monomethyl ester, and citraconic acid monoethyl ester; and a monomer (11) represented by $$\text{formula}: R^{11}R^{12}C{=}CR^{13}{-}R^{14}{-}COOY^{11}$$

wherein $R^{11}$ to $R^{13}$ each independently represent a hydrogen atom or a hydrocarbon group having a carbon number of 1 to 8, $R^{14}$ represents a single bond or a hydrocarbon group having a carbon number of 1 to 8, and $Y^{11}$ represents an inorganic cation and/or an organic cation.

The monomer (11) is as describe above.

The CTFE/TFE copolymer is a copolymer containing CTFE unit and TFE unit. The content of CTFE unit is preferably 10 to 90 mol %, more preferably 15 to 60 mol %, and still more preferably 18 to 40 mol %.

In some embodiments, the CTFE/TFE copolymer is a copolymer composed of CTFE, TFE, and a monomer copolymerizable with CTFE and TFE. Examples of the copolymerizable monomer include monomers represented by the following formulas $$CH_2{=}CX^5Rf^3, CF_2{=}CFRf^3, CF_2{=}CFORf^3, \text{ and } CH_2{=}C(Rf^3)_2$$

wherein $X^5$ represents a hydrogen atom or a fluorine atom, $Rf^3$ represents a fluoroalkyl group optionally containing an ether bond, and among others, preferred copolymerizable monomers are fluorine-containing vinyl monomers represented by $CF_2{=}CFRf^3$, $CF_2{=}CFORf^3$, and $CH_2{=}CX^5Rf^3$, and more preferred copolymerizable monomers are HFP, a perfluoro(alkyl vinyl ether) represented by $CF_2{=}CF{-}ORf^4$ wherein $Rf^4$ represents a perfluoroalkyl group having a carbon number of 1 to 5, and a fluorine-containing vinyl monomer represented by $CH_2{=}CX^5Rf^3$ wherein $Rf^3$ is a fluoroalkyl group having a carbon number of 1 to 8.

The production method of the present disclosure preferably also includes converting the fluorine-containing olefin compound (2) into a compound (4) being at least one selected from the group consisting of a halogen adduct and an oxide by a reaction between the fluorine-containing olefin compound (2) and a compound (3) being at least one selected from the group consisting of a halogenating agent and an oxidizing agent in the presence of the fluorine-containing ether compound (1) to provide a composition containing the fluorine-containing ether compound (1) and the compound (4), and separating the compound (4) from the provided composition to prepare the solvent.

The halogenating agent is preferably at least one of a chlorinating agent (a reagent having a chlorine atom) and a brominating agent (a reagent having a bromine atom).

Examples of the chlorinating agent include a chlorine gas; hypochlorites, such as sodium hypochlorite; chlorites, such as sodium chlorite; chlorates, such as sodium chlorate; and chlorine-containing interhalogen compounds. Examples of the chlorine-containing interhalogen compounds include chlorine monofluoride. Among these chlorinating agents, the chlorinating agent is preferably a chlorine gas or sodium hypochlorite. Each of the chlorinating agent may be used singly, or two or more thereof may be used in combination.

Examples of the brominating agent include bromine; bromates, such as potassium bromate; and bromine-containing interhalogen compounds. Examples of the bromine-containing interhalogen compounds include bromine monofluoride. Among these brominating agents, the brominating agent is preferably bromine. The brominating agents may be used each singly, or two or more of thereof may be used in combination.

Examples of the oxidizing agent include hydrogen peroxide water; oxygen; hypochlorites, such as sodium hypochlorite; chlorites, such as sodium chlorite; chlorates, such as sodium chlorate; and bromates, such as sodium bromide and potassium bromide. Each of the oxidizing agents may be used singly, or two or more thereof may be used in combination.

By the reaction between the fluorine-containing olefin compound (2) and the compound (3) in the presence of the fluorine-containing ether compound (1), a halogen is added to the fluorine-containing olefin compound (2) to produce a halogen adduct, or the fluorine-containing olefin compound (2) is oxidized to produce an oxide. As a result, the composition containing the fluorine-containing ether compound (1) and the compound (4) being at least one selected from the group consisting of the halogen adduct and the oxide is provided.

Next, by separating the compound (4) from the provided composition, the compound (4) is removed from the provided composition to prepare the solvent containing the fluorine-containing ether compound (1) at a high purity.

Distillation (particularly preferably rectification) is preferably adopted as the separation operation. In distillation (rectification in particular), a distillation column (rectification column in particular) having multistage theoretical plate numbers may be used, and, in some embodiments, any of continuous distillation and batch distillation is adopted. The pressure in performing distillation (rectification in particular) is preferably −0.05 MPa or higher and preferably 0.10 MPa or lower. When distillation (rectification in particular) is performed within such a pressure range, the difference in boiling points between the fluorine-containing ether compound (1) and the compound (4) may be made large (for example, the difference in boiling points may be made 10° C. or higher), and therefore the separation operation and separation accuracy are improved.

The distillation column (rectification column in particular) to be used in distillation (rectification in particular) has a theoretical plate number of preferably two or more and preferably 30 or less. The distillation column (rectification column in particular) to be used in distillation (rectification in particular) has a reflux ratio of preferably two or more and preferably 50 or less. The distillation column (rectification column in particular) is preferably formed with a material having resistance to corrosive action, such as glass, stainless steel (SUS), HASTALLOY, INCONEL, and MONEL, and is more preferably formed with SUS. Examples of the filler to be used in the distillation column (rectification column in particular) include Raschig ring and McMahon packing.

The solvent may suitably be prepared by, for example, a production method including the following step (A) and step (B) in the mentioned order.

Step (A)

The step (A) is a step of converting the fluorine-containing olefin compound (2) into the compound (4) being at least one selected from the group consisting of the halogen adduct and the oxide by a reaction between the fluorine-containing olefin compound (2) represented by formula: $R^3—CF{=}CF—R^4—O—R^2$ wherein $R^3$ represents H, F, a partially fluorinated alkyl group, or a completely fluorinated alkyl group, $R^4$ represents a single bond, a partially fluorinated alkylene group, or a completely fluorinated alkylene group, and $R^2$ is the same as described above, and the compound (3) being at least one selected from the group consisting of a halogenating agent and an oxidizing agent in the presence of the fluorine-containing ether compound (1) represented by formula: $R^1—O—R^2$ wherein $R^1$ represents a partially fluorinated alkyl group, and $R^2$ represents a non-fluorinated alkyl group, a partially fluorinated alkyl group, or a completely fluorinated alkyl group to provide the composition containing the fluorine-containing ether compound (1) and the compound (4).

Step (B)

The step (B) is a step of separating the compound (4) from the composition provided in the step (A) and containing the fluorine-containing ether compound (1) and the compound (4) to provide a purified solvent.

In the present disclosure, the fluorine-containing ether compound (1) may be synthesized by an already-known method. Preferred examples of the method for synthesizing the fluorine-containing ether compound (1) include a method for synthesizing the fluorine-containing ether compound (1) by a coupling reaction between a fluorine-containing raw material olefin compound represented by formula: $CX^1X^2{=}CF_2$ wherein $X^1$ and $X^2$ are the same or different and each represent a fluorine atom, a hydrogen atom, a partially fluorinated alkyl group, or a completely fluorinated alkyl group, the formula corresponding to the fluorine-containing ether compound (1), and an alcohol compound represented by formula: $R^2OH$ wherein $R^2$ is the same as described above, the formula corresponding to the fluorine-containing ether compound (1).

In the above-described coupling reaction, the reaction rate may be accelerated and the reaction yield may be improved by using a catalyst.

The catalyst is preferably a basic compound.

Examples of the basic compound include hydroxides, such as potassium hydroxide and sodium hydroxide; carbonates, such as potassium carbonate and sodium carbonate; and fluorides, such as potassium fluoride and cesium fluoride.

When, from a fluorine-containing olefin raw material compound and an alcohol compound, a corresponding fluorine-containing ether compound (1) is provided using a basic compound in the above-described coupling reaction, a corresponding fluorine-containing olefin compound (2) is likely to be produced as a by-product by a mode in which hydrogen fluoride is eliminated in the presence of the basic compound during the reaction.

The embodiments have been described above, and it will be understood that various changes in the embodiments and details may be made without departing from the spirit and scope of the claims.

The present disclosure provides a method for producing a fluoropolymer, the method including polymerizing a fluoromonomer in a solvent to produce the fluoropolymer, wherein the solvent contains a fluorine-containing ether compound (1) represented by formula: $R^1—O—R^2$ wherein $R^1$ represents a partially fluorinated alkyl group, and $R^2$ represents a non-fluorinated alkyl group, a partially fluorinated alkyl group, or a completely fluorinated alkyl group, and in the solvent, a content of a fluorine-containing olefin compound (2) represented by formula: $R^3—CF{=}CF—R^4—O—R^2$ wherein $R^3$ represents H, F, a partially fluorinated alkyl group, or a completely fluorinated alkyl group, $R^4$ represents a single bond, a partially fluorinated alkylene group, or a completely fluorinated alkylene group, and $R^2$ is the same as described above, is 1.00% by mass or less based on a content of the fluorine-containing ether compound (1).

In the method of the present disclosure, the fluorine-containing ether compound (1) is preferably a fluorine-containing ether compound (1-1) represented by formula: $X—Rf^1—CFH—Rf^2—O—R^2$ wherein X represents H, F, a non-fluorinated alkyl group, a partially fluorinated alkyl group, or a completely fluorinated alkyl group, $Rf^1$ and $Rf^2$ are the same or different and each represent a single bond or a completely fluorinated alkylene group while excluding the case where both $Rf^1$ and $Rf^2$ are single bonds, and $R^2$ is the same as described above.

In the method of the present disclosure, the fluorine-containing olefin compound (2) is preferably a fluorine-containing olefin compound (2-1-1) represented by formula: $X—Rf^1—CF{=}CF—Rf^{21}—O—R^2$ wherein X, $Rf^1$, and $R^2$ are the same as described above, and $Rf^{21}$ represents a single bond or a completely fluorinated alkylene group having a carbon number smaller by one than that of $Rf^2$, or a fluorine-containing olefin compound (2-1-2) represented by formula: $X—Rf^{11}—CF{=}CF—Rf^2—O—R^2$ wherein X, $Rf^2$, and $R^2$ are the same as described above, and $Rf^{11}$ represents a single bond or a completely fluorinated alkylene group having a carbon number smaller by one than that of $Rf^1$.

In the method of the present disclosure, the fluorine-containing ether compound (1) is preferably a fluorine-containing ether compound (1-2) represented by formula: $X—Rf^1—CFH—CF_2—O—R^2$ wherein X represents H, F, a non-fluorinated alkyl group, a partially fluorinated alkyl group, or a completely fluorinated alkyl group, $Rf^1$ represents a single bond or a completely fluorinated alkylene group, and $R^2$ is the same as described above.

In the method of the present disclosure, the fluorine-containing olefin compound (2) is preferably a fluorine-containing olefin compound (2-2-1) represented by formula: $X—Rf^1—CF{=}CF—O—R^2$ wherein X, $Rf^1$, and $R^2$ are the same as described above, or a fluorine-containing olefin compound (2-2-2) represented by formula: $X—Rf^{11}—CF{=}CF—CF_2—O—R^2$ wherein X and $R^2$ are the same as described above, and $Rf^{11}$ represents a single bond or a completely fluorinated alkylene group having a carbon number smaller by one than that of $Rf^1$.

In the method of the present disclosure, the fluorine-containing ether compound (1) is preferably a fluorine-containing ether compound (1-3) represented by formula: $F—CF_2—CFH—CF_2—O—R^2$ wherein $R^2$ is the same as described above.

In the method of the present disclosure, the fluorine-containing olefin compound (2) is preferably a fluorine-containing olefin compound (2-3-1) represented by formula: $F—CF_2—CF{=}CF—O—R^2$ wherein $R^2$ is the same as described above, or a fluorine-containing olefin compound (2-3-2) represented by formula: $F—CF{=}CF—CF_2—O—R^2$ wherein $R^2$ is the same as described above.

In the method of the present disclosure, the solvent preferably further contains water.

In the method of the present disclosure, the fluoromonomer is preferably at least one selected from the group consisting of tetrafluoroethylene, chlorotrifluoroethylene, and vinylidene fluoride.

In the method of the present disclosure, the fluoropolymer is preferably a fluororesin.

In the method of the present disclosure, the fluoropolymer is preferably at least one selected from the group consisting of a tetrafluoroethylene/perfluoro(alkyl vinyl ether) copolymer, an ethylene/tetrafluoroethylene copolymer, an ethylene/tetrafluoroethylene/hexafluoropropylene copolymer, a tetrafluoroethylene/vinylidene fluoride copolymer, and a chlorotrifluoroethylene/tetrafluoroethylene copolymer.

The production method of the present disclosure preferably includes converting the fluorine-containing olefin compound (2) into a compound (4) being at least one selected from the group consisting of a halogen adduct and an oxide by a reaction between the fluorine-containing olefin compound (2) and a compound (3) being at least one selected from the group consisting of a halogenating agent and an oxidizing agent in the presence of the fluorine-containing ether compound (1) to provide a composition comprising the fluorine-containing ether compound (1) and the compound (4), and separating the compound (4) from the provided composition to prepare the solvent.

EXAMPLES

Next, the embodiments of the present disclosure will be described with reference to Examples, but the present disclosure is not limited to those Examples.

The "purity" in the present disclosure means a component ratio (% by mass) determined by quantitative analysis in gas chromatography (GC). The "reflux ratio" in the present disclosure means a molar flow rate ratio of the reflux liquid to the distillate (reflux liquid/distillate). The unit of the pressure described in the present disclosure is gauge pressure unless otherwise noted. That is, the pressure is described assuming atmospheric pressure=0.0 MPa.

The numerical values in Examples were measured by the following methods.

Content of Each Component in Crude Products, Compositions, and Solvents

The content of each component in crude products, compositions, and solvents was measured by gas chromatography (GC).

Monomer Compositions of Fluoropolymers

The monomer compositions of fluoropolymers were determined by $^{19}$F-NMR measurement.

Melt Flow Rates (MFRs)

The melt flow rates were measured using a melt indexer (manufactured by Toyo Seiki Seisaku-sho Ltd.) in accordance with ASTM D1238 (or ASTM D 3307).

Preparation of Crude Products $CF_3CF{=}CF_2$ and $CH_3OH$ were reacted according to the method described in Non Patent Document 1 to provide a crude product containing $CF_3CFHCF_2OCH_3$, $CF_3CF{=}CFOCH_3$, and $CF_2{=}CFCF_2OCH_3$.

Similarly, $CF_3CF_2CF{=}CF_2$ and $CH_3OH$ were reacted to provide a crude product containing $CF_3CF_2CFHCF_2OCH_3$, $CF_3CF_2CF{=}CFOCH_3$, and $CF_3CF{=}CFCF_2OCH_3$.

Similarly, $CF_3CF{=}CF_2$ and $CF_3CF_2CH_2OH$ were reacted to provide a crude product containing $CF_3CFHCF_2OCH_2CF_2CF_3$, $CF_3CF{=}CFOCH_2CF_2CF_3$, and $CF_2{=}CFCF_2OCH_2CF_2CF_3$.

Similarly, $CF_3CF{=}CF_2$ and $C_3H_7OH$ were reacted to provide a crude product containing $CF_3CFHCF_2OC_3H_7$, $CF_3CF{=}CFOC_3H_7$, and $CF_2{=}CFCF_2OC_3H_7$.

In the following Preparation Examples, each crude product thus prepared was used.

Preparation Example 1

(Contact Reaction in Liquid Phase Using Chlorine Gas)

In a 1 L glass container, 300 g of the crude product containing $CF_3CFHCF_2OCH_3$ whose purity was 94.4% by mass and a fluorine-containing olefin compound whose purity was 1.38% by mass ($CF_3CF{=}CFOCH_3$ whose purity was 1.28% by mass and $CF_2{=}CFCF_2OCH_3$ whose purity was 0.10% by mass) was charged. Subsequently, a chlorine gas was supplied at 20 ml/min for 20 minutes to perform a contact reaction between the fluorine-containing olefin compound in the crude product and the chlorine gas at a pressure of 0.0 MPa in a liquid phase while the glass container was cooled at 0° C. Thereafter, 25 g of a 10%-by-mass aqueous sodium sulfite solution was added and the resultant mixture was stirred for 30 minutes, and after potassium iodide starch paper indicated disappearance of the chlorine gas, the organic phase was separated. The organic phase taken by separation was washed with water to provide 246 g of a composition containing $CF_3CFHCF_2OCH_3$ whose purity was 95.0% by mass (recovery ratio of $CF_3CFHCF_2OCH_3$, 82%).

(Rectification in Rectification Column)

An apparatus including a 500 mL glass container equipped with a glass rectification column (having a theoretical plate number of five) with a filler made of SUS, a condenser (the temperature of cooling water in the condenser: 0 to 5° C.), and a fractionator was prepared, and 220 g of the composition (246 g) containing $CF_3CFHCF_2OCH_3$ provided above was put into the apparatus to keep a total reflux state for one hour. Thereafter, fractional distillation was started from a reflux ratio of 50, and the rectification was completed at the time when 177 g of a fraction was recovered. The analysis of the resultant fraction by GC demonstrates that the purity of $CF_3CFHCF_2OCH_3$ is 99.9% by mass (recovery ratio 80%) and the purity of the fluorine-containing olefin compound is 0.01% by mass. Note that the presence of a chlorine adduct of the fluorine-containing olefin compound and the presence of an oxide of the fluorine-containing olefin compound were not confirmed by the GC analysis of the resultant fraction.

Preparation Example 2

(Contact Reaction in Liquid Phase Using Sodium Hypochlorite)

In a 1 L glass container, 220 g of the crude product containing $CF_3CF_2CFHCF_2OCH_3$ whose purity was 94.4% by mass and a fluorine-containing olefin compound whose purity was 1.37% by mass ($CF_3CF_2CF{=}CFOCH_3$ whose purity was 1.27% by mass and $CF_3CF{=}CFCF_2OCH_3$ whose purity was 0.10% by mass) and 64 g of a 12%-by-mass aqueous sodium hypochlorite solution were charged. Subsequently, the resultant mixture was stirred at room temperature for 18 hours to perform a contact reaction between the fluorine-containing olefin compound in the crude product and sodium hypochlorite at a pressure of 0.0 MPa in a liquid phase. Thereafter, 15.5 g of a 10%-by-mass aqueous sodium sulfite solution was added and the resultant mixture was stirred for 30 minutes, and after potassium iodide starch paper indicated disappearance of sodium hypochlorite, the organic phase was taken by separation. The organic phase taken by separation was washed with water to provide 183 g of a composition containing $CF_3CF_2CFHCF_2OCH_3$ (recovery ratio of $CF_3CF_2CFHCF_2OCH_3$: 83%).

(Rectification in Rectification Column)

An apparatus including a 500 mL glass container equipped with a rectification column (having a theoretical plate number of five) with a filler made of SUS, a condenser (the temperature of cooling water in the condenser: 0° C. to 5° C.), and a fractionator was prepared, and 90 g of the composition (183 g) containing $CF_3CF_2CFHCF_2OCH_3$ provided above was fed thereinto to keep a total reflux state for one hour. Thereafter, fractional distillation was started from a reflux ratio of 50, and the rectification was completed at the time when 71 g of a fraction was recovered. The analysis of the resultant fraction by GC demonstrates that the purity of $CF_3CF_2CFHCF_2OCH_3$ is 99.9% by mass (recovery ratio 79%) and the purity of the fluorine-containing olefin compound is 0.01% by mass. Note that the presence of a chlorine adduct of the fluorine-containing olefin compound and the presence of an oxide of the fluorine-containing olefin compound were not confirmed by the GC analysis of the resultant fraction.

Preparation Example 3

Compositions each containing a fluorine-containing ether compound having a different structure and compositions in which the contents (purities) of the fluorine-containing ether compounds were different were provided in the same manners as in Preparation Examples 1 and 2 except that the amount of the chlorine gas or sodium hypochlorite added and the reaction time were changed.

In the following Examples, the compositions provided in Preparation Examples 1 to 3 were used as solvents. The main components of the solvents (compositions) are described below. The content of each component is a content (purity) based on the mass of the solvent.

Solvent A
- $CF_3CFHCF_2OCH_3$: 99.9% by mass
- $CF_3CF{=}CFOCH_3$ and $CF_2{=}CFCF_2OCH_3$: 0.01% by mass Solvent B
- $CF_3CFHCF_2OCH_3$: 99.7% by mass
- $CF_3CF{=}CFOCH_3$ and $CF_2{=}CFCF_2OCH_3$: 0.10% by mass Solvent C
- $CF_3CFHCF_2OCH_3$: 98.7% by mass
- $CF_3CF{=}CFOCH_3$ and $CF_2{=}CFCF_2OCH_3$: 0.99% by mass Solvent D
- $CF_3CF_2CFHCF_2OCH_3$: 99.9% by mass
- $CF_3CF_2CF{=}CFOCH_3$ and $CF_3CF{=}CFCF_2OCH_3$: 0.01% by mass Solvent E
- $CF_3CFHCF_2OCH_2CF_2CF_3$: 99.9% by mass
- $CF_3CF{=}CFOCH_2CF_2CF_3$ and $CF_2{=}CFCF_2OCH_2CF_2CF_3$: 0.01% by mass Solvent F
- $CF_3CFHCF_2OC_3H_7$: 99.9% by mass
- $CF_3CF{=}CFOC_3H_7$ and $CF_2{=}CFCF_2OC_3H_7$: 0.01% by mass Solvent G
- $CF_3CFHCF_2OCH_3$: 97.0% by mass
- $CF_3CF{=}CFOCH_3$ and $CF_2{=}CFCF_2OCH_3$: 2.50% by mass Example 1

An autoclave having an internal volume of 4 L equipped with a stirrer was charged with 1,200 g of distilled water and was sufficiently purged with nitrogen, and then 1,000 g of solvent A, 150 g of perfluoro(propyl vinyl ether) ($CF_2{=}CFOCF_2CF_2CF_3$) [PPVE], and 15 g of methanol were charged, and the temperature in the system was kept at 35° C. Subsequently, tetrafluoroethylene [TFE] was injected to 0.86 MPaG, and then 0.16 g of di-n-propylperoxydicarbonate [NPP] was fed therein to start polymerization. The pressure inside the system decreased with the progress of the polymerization, and therefore TFE was continuously supplied to make the pressure constant, and the polymerization was continued until the amount of TFE consumed reached 200 g. PPVE was appropriately added so as to make the concentration in the system constant and continuously charged in an amount of 11 g in total. The polymerization took 280 minutes. The pressure was released and returned to atmospheric pressure, and a resultant reaction product was then washed with water and dried to provide 190 g of a powder. The melt flow rate (MFR) (372° C.) of the resultant fluoropolymer was 15 g/10 min. The content rate (molar ratio) of each monomer unit of the resultant fluoropolymer was TFE:PPVE=97.9:2.1.

Example 2

Polymerization was performed in the same manner as in Example 1 except that solvent B was used. The polymerization took 290 minutes. The pressure was released and returned to atmospheric pressure, and a resultant reaction product was then washed with water and dried to provide 180 g of a powder. The MFR (372° C.) of the resultant fluoropolymer was 55 g/10 min. The content rate (molar ratio) of each monomer of the resultant fluoropolymer was TFE:PPVE=98.0:2.0.

Example 3

Polymerization was performed in the same manner as in Example 1 except that solvent C was used. The polymerization took 300 minutes. The pressure was released and returned to atmospheric pressure, and a resultant reaction product was then washed with water and dried to provide 190 g of a powder. The MFR (372° C.) of the resultant fluoropolymer was 65 g/10 min. The content rate (molar ratio) of each monomer of the resultant fluoropolymer was TFE:PPVE=97.9:2.1.

Example 4

Polymerization was performed in the same manner as in Example 1 except that solvent D was used. The polymerization took 280 minutes. The pressure was released and returned to atmospheric pressure, and a resultant reaction product was then washed with water and dried to provide 190 g of a powder. The MFR (372° C.) of the resultant fluoropolymer was 14 g/10 min. The content rate (molar ratio) of each monomer of the resultant fluoropolymer was TFE:PPVE=98.0:2.0.

Example 5

Polymerization was performed in the same manner as in Example 1 except that solvent E was used. The polymerization took 290 minutes. The pressure was released and returned to atmospheric pressure, and a resultant reaction product was then washed with water and dried to provide 190 g of a powder. The MFR (372° C.) of the resultant fluoropolymer was 25 g/10 min. The content rate (molar ratio) of each monomer of the resultant fluoropolymer was TFE:PPVE=97.9:2.1.

Example 6

Polymerization was performed in the same manner as in Example 1 except that solvent F was used. The polymerization took 300 minutes. The pressure was released and returned to atmospheric pressure, and a resultant reaction product was then washed with water and dried to provide 190 g of a powder. The MFR (372° C.) of the resultant fluoropolymer was 35 g/10 min. The content rate (molar ratio) of each monomer of the resultant fluoropolymer was TFE:PPVE=97.9:2.1.

Example 7

An autoclave having an internal volume of 4 L equipped with a stirrer was charged with 1,200 g of distilled water and was sufficiently purged with nitrogen, and then 830 g of solvent A was charged, and the temperature in the system was kept at 35° C. Thereafter, a mixed gas of tetrafluoroethylene [TFE]/ethylene [Et]=82/18 mol % was charged until the pressure in the system reached 0.78 MPaG. Further, 5 g of perfluoro(1,1,5-trihydro-1-pentene) and 5 g of cyclohexane were charged, and then 3.3 g of di-n-propylperoxydicarbonate [NPP] was fed therein to start polymerization. The pressure inside the system decreased with the progress of the polymerization, and therefore the mixed gas was continuously supplied so as to make the formulation in the container uniform and the pressure inside the system was kept at 0.78 MPaG. Perfluoro(1,1,5-trihydro-1-pentene) was also continuously charged in an amount of 8 g in total, and the polymerization was continued. The polymerization was performed until 200 g of the mixed gas was consumed, and the polymerization on that occasion took 240 minutes. Thereafter, the pressure was released and returned to atmospheric pressure, and a product of the reaction was washed with water and dried to provide 180 g of a powder. The MFR (297° C.) of the resultant fluoropolymer was 30 g/10 min. The content rate (molar ratio) of each monomer of the resultant fluoropolymer was TFE:Et:$CH_2$=CF($CF_2$)$_3$H=54.0:44.5:1.5.

Comparative Example 1

Polymerization was performed in the same manner as in Example 1 except that solvent G was used. The reaction was performed for 1,200 minutes, but the polymerization hardly progressed. The pressure was released and returned to atmospheric pressure, and a resultant reaction product was then washed with water and dried to provide 20 g of a powder. The MFR (372° C.) of the resultant fluoropolymer was 1,200 g/10 min. The content rate (molar ratio) of each monomer of the resultant fluoropolymer was TFE: PPVE=98.0:2.0.

Comparative Example 2

Polymerization was performed in the same manner as in Example 7 except that solvent G was used. The polymerization took 480 minutes. The pressure was released and returned to atmospheric pressure, and a resultant reaction product was then washed with water and dried to provide 190 g of a powder. The MFR (297° C.) of the resultant fluoropolymer was 150 g/10 min. The content rate (molar ratio) of each monomer of the resultant fluoropolymer was TFE:Et:C$CH_2$=CF($CF_2$)$_3$H=54.0:44.5:1.5.

What is claimed is:

1. A method for producing a fluoropolymer, the method comprising polymerizing a fluoromonomer in a solvent to produce the fluoropolymer, wherein the solvent comprises a fluorine-containing ether compound (1) represented by formula: $R^1$—O—$R^2$ wherein $R^1$ represents a partially fluorinated alkyl group, and $R^2$ represents a non-fluorinated alkyl group, a partially fluorinated alkyl group, or a completely fluorinated alkyl group, and in the solvent, a content of a fluorine-containing olefin compound (2) represented by formula: $R^3$—CF—CF—$R^4$—O—$R^2$ wherein $R^3$ represents H, F, a partially fluorinated alkyl group, or a completely fluorinated alkyl group, $R^4$ represents a single bond, a partially fluorinated alkylene group, or a completely fluorinated alkylene group, and $R^2$ is the same as described above, provided that a perfluoro (alkyl vinyl ether) is excluded from the fluorine-containing olefin compound (2), is 1.00% by mass or less based on a content of the fluorine-containing ether compound (1), wherein the fluoromonomer is at least one selected from the group consisting of tetrafluoroethylene, chlorotrifluoroethylene, and vinylidene fluoride.

2. The method according to claim 1, wherein the fluorine-containing ether compound (1) is a fluorine-containing ether compound (1-1) represented by formula: X—$Rf^1$—CFH—$Rf^2$—O—$R^2$ wherein X represents H, F, a non-fluorinated alkyl group, a partially fluorinated alkyl group, or a completely fluorinated alkyl group, $Rf^1$ and $Rf^2$ are the same or different and each represent a single bond or a completely fluorinated alkylene group while excluding the case where both $Rf^1$ and $Rf^2$ are single bonds, and $R^2$ is the same as described above.

3. The method according to claim 2, wherein the fluorine-containing olefin compound (2) is a fluorine-containing olefin compound (2-1-1) represented by formula: X—$Rf^1$—CF—CF—$Rf^{21}$—O—$R^2$ wherein X, $Rf^1$, and $R^2$ are the same as described above, and $Rf^{21}$ represents a single bond or a completely fluorinated alkylene group having a carbon number smaller by one than that of $Rf^2$, or a fluorine-containing olefin compound (2-1-2) represented by formula: X—$Rf^{11}$—CF=CF—$Rf^2$—O—$R^2$ wherein X, $Rf^2$, and $R^2$ are the same as described above, and $Rf^{11}$ represents a single bond or a completely fluorinated alkylene group having a carbon number smaller by one than that of $Rf^1$.

4. The method according to claim 1, wherein the fluorine-containing ether compound (1) is a fluorine-containing ether compound (1-2) represented by formula: X—$Rf^1$—CFH—$CF_2$—O—$R^2$ wherein X represents H, F, a non-fluorinated alkyl group, a partially fluorinated alkyl group, or a completely fluorinated alkyl group, $Rf^1$ represents a single bond or a completely fluorinated alkylene group, and $R^2$ is the same as described above.

5. The method according to claim 4, wherein the fluorine-containing olefin compound (2) is a fluorine-containing olefin compound (2-2-1) represented by formula: X—$Rf^1$—CF—CF—O—$R^2$ wherein X, $Rf^1$, and $R^2$ are the same as described above, or a fluorine-containing olefin compound (2-2-2) represented by formula: X—$Rf^{11}$—CF—CF—$CF_2$—O—$R^2$ wherein X and $R^2$ are the same as described above, and $Rf^{11}$ represents a single bond or a completely fluorinated alkylene group having a carbon number smaller by one than that of $Rf^1$.

6. The method according to claim 1, wherein the fluorine-containing ether compound (1) is a fluorine-containing ether compound (1-3) represented by formula: F—$CF_2$—CFH—$CF_2$—O—$R^2$ wherein $R^2$ is the same as described above.

7. The method according to claim 6, wherein the fluorine-containing olefin compound (2) is a fluorine-containing olefin compound (2-3-1) represented by formula: $F—CF_2—CF{=}CF—O—R^2$ wherein $R^2$ is the same as described above, or a fluorine-containing olefin compound (2-3-2) represented by formula: $F—CF—CF—CF_2—O—R^2$ wherein $R^2$ is the same as described above.

8. The method according to claim 1, wherein the solvent further comprises water.

9. The method according to claim 1, wherein the fluoropolymer is a fluororesin.

10. The method according to claim 1, wherein the fluoropolymer is at least one selected from the group consisting of a tetrafluoroethylene/perfluoro (alkyl vinyl ether) copolymer, an ethylene/tetrafluoroethylene copolymer, an ethylene/tetrafluoroethylene/hexafluoropropylene copolymer, a tetrafluoroethylene/vinylidene fluoride copolymer, and a chlorotrifluoroethylene/tetrafluoroethylene copolymer.

11. The method according to claim 1, comprising converting the fluorine-containing olefin compound (2) into a compound (4) being at least one selected from the group consisting of a halogen adduct and an oxide by a reaction between the fluorine-containing olefin compound (2) and a compound (3) being at least one selected from the group consisting of a halogenating agent and an oxidizing agent in the presence of the fluorine-containing ether compound (1) to provide a composition comprising the fluorine-containing ether compound (1) and the compound (4), and separating the compound (4) from the provided composition to prepare the solvent.

* * * * *